(No Model.) 4 Sheets—Sheet 2.
G. F. KOLB.
CASH REGISTER AND INDICATOR.
No. 457,728. Patented Aug. 11, 1891.
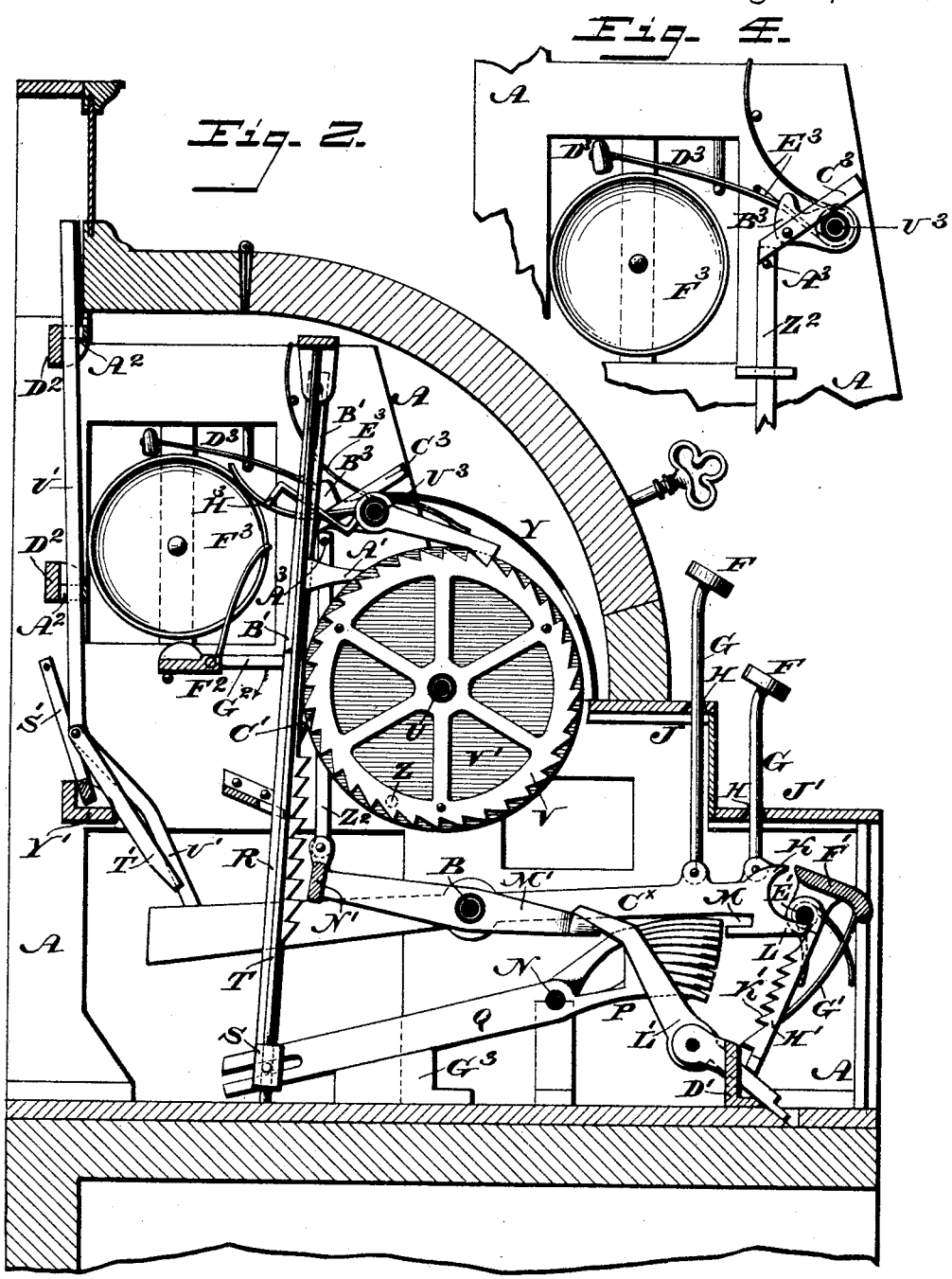
WITNESSES: 
L. Douville,
Robt. Nilon
INVENTOR
George F. Kolb
BY John A. Wiederoheim
ATTORNEY.

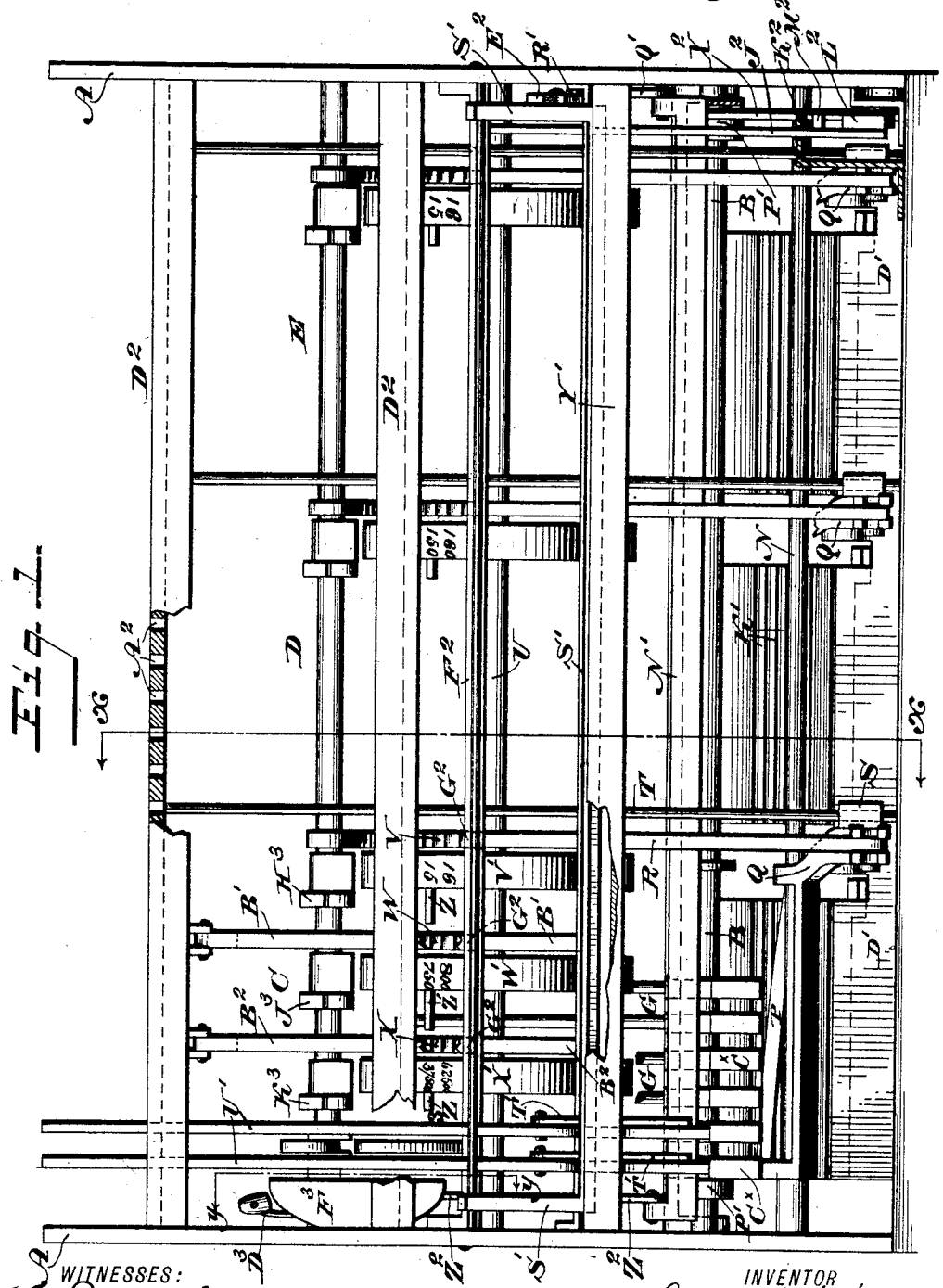

(No Model.) 4 Sheets—Sheet 3.

G. F. KOLB.
CASH REGISTER AND INDICATOR.

No. 457,728. Patented Aug. 11, 1891.

WITNESSES:
L. Douville,
Robt. Aitou

INVENTOR
George F. Kolb
BY
ATTORNEY.

(No Model.) 4 Sheets—Sheet 4.
G. F. KOLB.
CASH REGISTER AND INDICATOR.

No. 457,728. Patented Aug. 11, 1891.

Fig. 6.

UNITED STATES PATENT OFFICE.

GEORGE F. KOLB, OF PHILADELPHIA, PENNSYLVANIA.

CASH REGISTER AND INDICATOR.

SPECIFICATION forming part of Letters Patent No. 457,728, dated August 11, 1891.

Application filed November 4, 1890. Serial No. 370,352. (No model.)

*To all whom it may concern:*

Be it known that I, GEORGE F. KOLB, a citizen of the United States, residing in the city and county of Philadelphia, State of Pennsylvania, have invented a new and useful Improvement in Cash-Registers, which improvement is fully set forth in the following specification and accompanying drawings.

My invention relates to improvements in cash-registers; and it consists of mechanism for preventing the return of a key-lever to its normal position before the completion of its stroke.

It further consists of means, substantially as described, for preventing the operation of a second key-lever after the initial of the movement of the first until the return of the latter to its normal position.

It further consists of novel mechanism moved by an operating-key bar for unlocking the drawer.

It further consists of novel mechanism for striking the alarm.

It further consists of novel carrying mechanism.

It further consists of novel tablet-operating mechanism.

It further consists of novel mechanism for restoring the operating rack-bar to its normal position.

It finally consists of the combination of parts hereinafter set forth.

Figure 3:
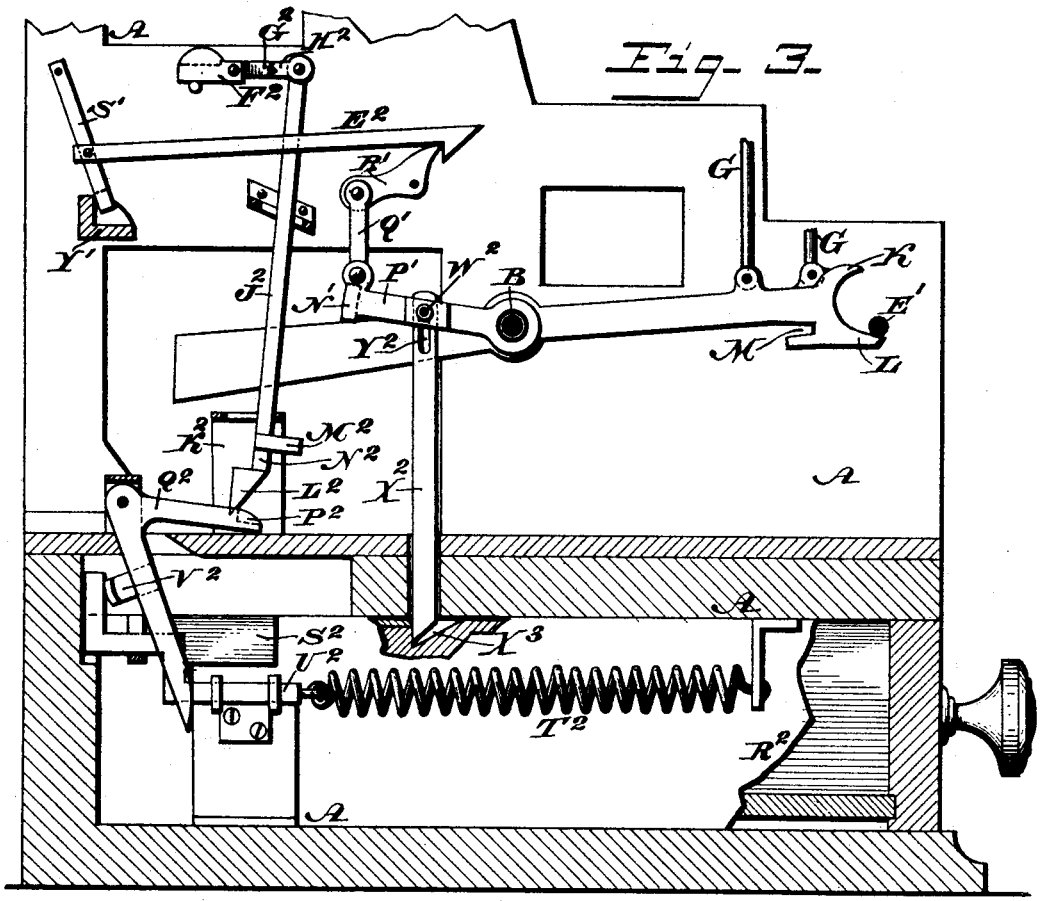
Figure 5:
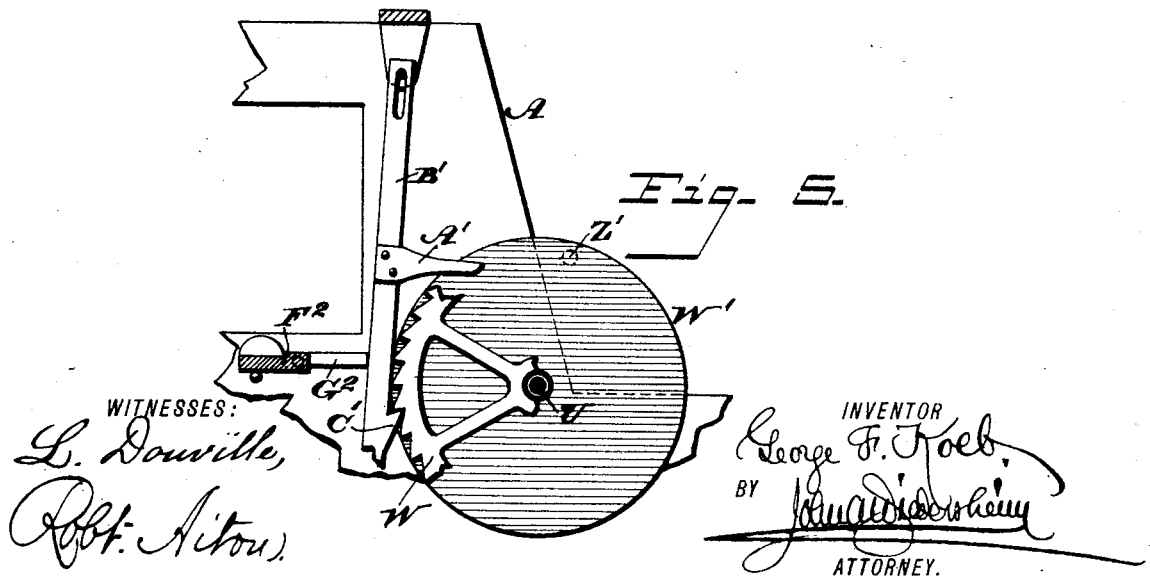

Figure 1 represents a rear view of the device, the casing and a portion of the dimes and dollars mechanisms being removed. Fig. 2 represents a sectional view on line $x\,x$, Fig. 1. Fig. 3 represents an end view of a portion of the device, the frame being removed at that end. Fig. 4 represents a vertical section on line $y\,y$, Fig. 1, showing the alarm device. Fig. 5 represents a side view of the carrying mechanism. Fig. 6 represents a side view of a depressed key, showing the locking-plate in position for preventing the movement of the other levers. Fig. 7 represents a side view of a modification of the comb-plate.

Similar letters of reference indicate corresponding parts in the several figures.

Referring to the drawings, A designates the frame of the register, and B a shaft extending across the same and secured to the sides thereof. Pivotally mounted on the said shaft are three series of key-levers for operating, respectively, the cents C, dimes D, and dollars E portions of the mechanism of the device, the parts of each of said series being similar in construction. The number of series, however, may, if desired, be more than three.

The key-heads F are provided with the stems G, which are pivoted at their lower ends to the key-levers $C^x$, so that in operating the said levers the stems are moved in a vertical line in the openings H of the banks J and J' of the frame, the said key-heads with their stems being arranged in two rows, one for the even and the other for the odd units of each denomination. The key-levers, which normally are in the same plane, have their front ends recessed, thus forming thereon upper and lower projecting portions or teeth K and L, respectively, and on the rear of the lower portion of each of said front ends is a recess M, said teeth and recess being for the purposes hereinafter explained.

On a shaft N, secured in the sides of the frame and parallel with the shaft B, are mounted the comb-plates P, one for each denomination or series of key-levers. Each of said comb-plates consists of a series of nine forwardly-extending teeth arranged at different heights corresponding to the lever to be operated, the highest tooth corresponding to the unit-nine lever, so that the rear end of the rearwardly-extending arm Q of the comb-plate will be raised the greatest distance when said lever is operated. Pivotally connected with the rear end of the said arm Q is the rack-bar R, having secured thereto a collar S, which is guided on the vertical rod T, suitably supported in the frame A, said collar serving as a guide for the said arm and bar in their rising and falling movements.

Mounted on a shaft U above and parallel with the shaft B are three sets of registry-wheels with connected ratchet-wheels, one set V V', W W', and X X' for the cents and similar wheels for the dimes and the dollars portions of the machine. The ratchet-wheel V is adapted to be engaged by the teeth of the rack-bar R and be rotated by the rising movement of the same, and its connected register-wheel V' has on its periphery and corresponding with each tooth thereof a number, so that the rotation of the wheels V V' will indicate by the number on the register-wheel at an opening in a plate Y the amount registered. When the total number on the register-wheel V' has been reached, to register a greater number than indicated thereon the additional ratchet and register wheels W and W' and X and X' are employed. On the side of the wheel V', adjacent to the ratchet-wheel W, is a pin Z, adapted to come in contact at each revolution of said wheel V' with a projection A' on a rising and falling slotted arm B', which latter has a tooth C', adapted to engage the ratchet-wheel W. The projection A' is of such form as to permit the contact of the said pin Z therewith a sufficient time to raise the arm B', so that the movement of the tooth C' will rotate the wheels W W' the space of one tooth, which movement is indicated on the wheel W' by the increased number on its periphery at an opening in the said plate Y.

The wheels X X' are operated by the movement of the pin Z' and the arm $B^2$, similar to the operation of the wheels W and W'. To aid in securing the complete and equal movement of each of the key-levers before they can be returned to their normal position a bar D', secured to the frame, extends across the machine and receives on its horizontal upper edge each of the key-levers on the completion of its downward stroke.

E' designates a shaft extending across the frame A parallel with the shaft B and having mounted thereon a rocking plate F', also extending across the device, and which has an edge thereof adjacent to and parallel with the front edges of the teeth K of the levers $C^x$. The said plate F' is provided with the depending arms G', which bear against the plates H', which are also mounted on the shaft E'. A separate plate H' is provided for each series of key-levers, and each of the said plates, which normally swings inward, so as to bring its lower end against the bar D', has on its inner face a series of ratchet-teeth K' so arranged that an upward movement of a key-lever, which has its tooth L engaged therewith, is prevented until the said lever has fully completed its downward movement, when a plate H' has been swung or pushed outward by the said tooth L, so as to be held by one end of the weighted lever L', which is pivoted to a projection on the bar D'. To raise the weighted end of the lever L' and thereby release its light end from contact with the plate H', an arm M' is employed, the same being mounted on the shaft B, so as to rotate thereon, and having an end secured to a cross frame or bar N', adapted to be raised by the upward movement of the rear end of a key-lever and on the fall of the same to be lowered by its own weight.

The frame or bar N', which extends across the device, and which is adapted to be raised by the depression of a key and the consequent movement of a key-lever, has at or near its ends the arms P', which are mounted on the shaft B, and at one end has a link connection Q' with one limb of an angular lever R', the latter being pivoted to the end wall of the frame A. Pivoted to the rear of the frame A is a swinging frame S', having a cross-bar adapted to be brought in contact with a pivoted lower limb T' of the tablet-rod U', so as to displace the said limb from the support Y', to which it has been lifted by the raising of the rear end of a key-lever on which a bent or projecting lower portion of the tablet-rod rests, and thereby lowering the tablet. The straight upper portions of the tablets U' move in openings $A^2$ in the cross-bars $D^2$ $D^2$, secured to the frame A, so as to be guided vertically in their movements. The frame S' is operated by means of an arm or lever $E^2$ pivoted thereto, the latter having a nose adapted to engage with at certain times one end of a limb of the lever R' and at other times to be disengaged from said limb and ride on the upper edge of the said lever.

To keep the rack-bar R and the arms B' $B^2$ in engagement with the teeth of the ratchet-wheels V, W, and X, respectively, an oscillating bar or frame $F^2$, having the arms $G^2$, is employed. The said bar $F^2$ is weighted, so as normally to have its arms $G^2$ bearing against the said rack-bar and arms B' $B^2$, and is provided with mechanism adapted to rock it, so as to remove the said arms $G^2$ from said parts, said mechanism consisting of an arm $H^2$, which is pivotally connected with the upper end of a rod $J^2$, the latter having its lower end movable in a slotted guide-piece $K^2$ and provided with a nose or hook $L^2$ of greater thickness than the rod, and a stop or retaining-piece $M^2$, forming a passage-way $N^2$ for a stud $P^2$ on the angle-lever $Q^2$, pivoted to the frame. On the side of the drawer $R^2$ of the device is a block or stud $S^2$, which is adapted to bear against the said angle-lever when the drawer is pushed in, so as to lower the upper limb of the same, and thereby the rod $J^2$, thus rocking the bar $F^2$ and lowering the arms $G^2$, and thereby permitting the rack-bar R and the arms B' $B^2$ to fall away from the ratchet-wheels. A coil-spring $T^2$, having one end secured to the frame A and the other end to a sliding bolt $U^2$, which moves in guides and bears against an arm $V^2$ on one of the limbs of the angle-lever $Q^2$, serves to raise the said lever $Q^2$, so as to engage its stud $P^2$ with the rod $J^2$, and thus be in condition to lower said rod when required. The bolt $U^2$ also bears against the block $S^2$, so that the spring $T^2$ is enabled to open the drawer when the locking-bolt $X^2$ is withdrawn from the recess $X^3$. The said bolt $X^2$ is attached by a pin $W^2$ to one of the arms P' and is provided with a vertical extending slot $Y^2$, through which the said pin $W^2$ passes, and which permits the bolt to ride on the upper edge of the side of the drawer until the latter is moved in sufficiently for the depression $X^3$ in the top of its side and adapted to receive the lower end of the bolt to be in line therewith, the walls of said depression being so shaped with reference to the bolt as to prevent the latter from being raised therefrom by any attempted withdrawal of the said drawer from the frame. Connected with the other end of the bar N' is a rod $Z^2$, moving in ways secured to the frame A, and having a pin $A^3$ projecting from its side at or near the upper end thereof, and mounted on a shaft $U^3$ is an arm $B^3$, having a pivoted arm $C^3$, with a bell-hammer $D^3$ connected therewith. The said arm $C^3$, which has one end bearing on the shaft $U^3$, has its other end above said pin $A^3$ during a portion of the upward movement of the rod $Z^2$, whereby the arm $B^3$ with the bell-hammer is raised, but when the said rod has raised the arm $B^3$ a sufficient height the end of the arm $C^3$ is disengaged from the said pin, whereby, owing to the weight of the arm and hammer and the action of a coil-spring $E^3$, secured to said arm and to the shaft $U^3$, the hammer falls, striking the bell $F^3$ and thus sounding an alarm. The parts are so timed that the tripping of the hammer-arm occurs just before the key-lever has completed its downward movement.

$G^3$ designates a block adapted to support the arm Q of the comb-plate, so that the end thereof having the rack-bar connected therewith will not come in contact with the frame of the machine on its descent when said rack-bar is released from its ratchet-wheel.

The plate Y, which is of curved form, is pivotally connected with the shaft $U^3$, so as to move thereon, and is provided with the fingers $H^3$, $J^3$, and $K^3$, adapted when the plate is raised to contact with the pins Z Z' $Z^3$ on the sides of the register-wheels V', W', and X', respectively, thereby determining the proper positions of the zero-spaces thereon in relation to openings in the said plates when resetting the said wheels.

The operation of the device is as follows: The parts of the machine being in normal position, a key corresponding to the number to be registered is depressed, thus lowering its stem and the front end of its lever. As the lever is lowered, the tooth L rides over the ratchet-teeth K' of the plate H', pushing out the said plate, the said teeth preventing the upward movement of the lever until the plate is moved outward sufficiently to clear the tooth L of the ratchet-teeth, as hereinafter explained. When the tooth K of a lever has passed below the front edge of the plate F' and the tooth L of the same engages the ratchet-teeth K', the plate H' so moves the plate F' and holds the same that the front edge of the latter is under the teeth K of each of the other levers and preventing the depression of any of the same until the first or operated lever is restored to its normal position. As the lever is depressed, it comes in contact with the corresponding tooth of the comb-plate, and lowering the same so moves the said plate as to raise the end of its rearwardly-extending arm Q, with its connected rack-bar R, that the latter will move or rotate the wheel V' the proper number of spaces desired, the total being indicated by the number on the periphery at the opening in the plate Y. As is seen, the teeth of the lowest unit or digit is farthest from its lever when the levers and comb-plate are in normal position, and so has the shortest distance to travel of any of the comb-plate teeth, thereby raising the end of the arm Q to a less height, and consequently rotating the wheel V' less spaces. As the rear end of the key-lever is raised, it lifts the cross-bar N', which normally rests thereon, and so raises the rod $Z^2$, the pin $A^3$ engaging an end of the arm $C^3$, raising one end of the same, and thereby the arm $B^3$, with the hammer-arm $D^3$. When the end of the arm $C^3$ has been raised sufficiently to allow the pin $A^3$ to pass the same, and thereby release the said arm therefrom, the weight of the arm $B^3$, with the bell-hammer, aided by the coil-spring $E^3$, causes the said hammer to fall and strike the bell, thus ringing an alarm. The lifting of the bar N' also raises the arms P', and thereby the bolt $X^2$, so as to permit the opening of the drawer by means of the spring $T^2$ and the bolt $U^2$. As the rear end of a key-lever is raised, a tablet-rod is lifted until the lower end of the pivoted portion T" thereof is above the seat Y', when said portion swings in line with the straight upper portion of the rod, so as to sustain said rod on the said seat. The raising of the bar N' rocks the arms M', so as to permit the weighted end of the lever L' to lower, the other end of the latter rising to engage the lower projecting edge of the plate H', and thus keep the same away from the teeth L of an operating-lever while the latter is being returned to its normal position. During the latter portion of the downward movement of a key-lever the front end of the comb-plate tooth with which it contacts enters the recess M in the rear of the front end of the lever and aids in locking the upward movement of the lever until the comb-plate is released by the lowering of the rack-bar R. To lower the rack-bar, and thereby restore the comb-plate to its normal position, so that a second register can be made, the drawer $R^2$ is pushed in, forcing the block $S^2$ against the lower limb of the angle-lever $Q^2$, and thereby lowering the upper limb thereof, so that the rod $J^2$ connected therewith is drawn down, thus lowering the arm $H^2$, and thereby oscillating the weighted bar $F^2$, so that the arms $G^2$ are lowered. This action releases the rack-bar R and swinging arm B' from their ratchet-wheels, so that the same are free to fall by their own weight. As the upper limb of the angle-lever $Q^2$ is near the end of its downward movement, its stud $P^2$ slips from engagement in the recess $N^2$ of the rod $J^2$, so that the said rod is free to rise, thereby permitting the oscillation of the bar $F^2$ and the return of its arm $G^2$ against the rack-bar R and arms B' and $B^2$, thus insuring the engagement of the same with their ratchet-wheels. When the rear end of a key-lever is lowered, the bar N' falls by its own weight, thereby oscillating the arm M', so as to raise the weighted end of the lever L' and lower the other end thereof, which latter engages the lower end of the plate H', thereby permitting at the proper time the lower end of the said plate to swing inward or toward the bar D', the plate F' also oscillating into position to permit a key-lever to pass its edge. The dropping of said bar N' also lowers the arm P', thereby permitting the lower end of bolt $X^2$ to drop into the recessed side of the drawer when the latter is pushed into the casing.

The arm $E^2$, which is pivoted to the frame S', has its hook or nose end in engagement with a limb of the angle-lever R' just before the raising of the cross-bar N' by a key-lever, so that the lifting of the said cross-bar operates the said lever, so as to draw the arm $E^2$ forward, and thereby oscillate the said frame, forcing the limb T' of the tablet-rod from its seat Y', thereby lowering the said rod.

The plate Y, with its fingers for determining the resetting of the register-wheel, is not claimed herein, being described and claimed in an application filed by me May 10, 1890, Serial No. 351,233.

In Fig. 7 is shown a modification of the comb-plate, wherein the contact portion thereof with the operating key-levers consists of an inclined bar having a series of recesses forming steps which are at different distances from the levers when the latter are at rest.

Having thus described my invention, what I claim as new, and desire to secure by Letters Patent, is—

1. In a register, a series of oscillating key-levers having a common pivotal shaft, a shaft located in front of said levers, an oscillating plate mounted on said second shaft and having a front edge parallel with the front edges of said levers, and a second plate mounted on said second shaft and adapted to be operated by any one of said key-levers, so as to move the edge of said oscillating plate in the path of the remainder of said key-levers, said parts being combined substantially as described.

2. In a register, an oscillating key-lever having upper and lower teeth or projections on its front end, a pivoted plate normally in the path of movement of said upper tooth, and a second swinging plate with ratchet-teeth adapted to be engaged by said lower tooth, said parts being combined substantially as described.

3. In a register, an oscillating key-lever having upper and lower teeth or projections on its front end, a pivoted plate with an edge normally in the path of movement of said upper tooth and having depending arms, and a pivoted plate having ratchet-teeth, said depending arms of the first plate bearing against said second plate, said parts being combined substantially as described.

4. In a register, a series of oscillating key-levers, operating-stems pivotally connected with said levers, a shaft in front of said levers with an oscillating plate mounted thereon, and a swinging plate on said shaft bearing against a depending arm on said first plate, said parts being combined substantially as described.

5. In a register, a series of oscillating key-levers, each having recessed front ends forming upper and lower teeth, a shaft with a rocking plate thereon having an edge parallel with the front edges of the upper row of teeth on the lever, and a second rocking plate on said shaft adapted to be operated by the contact therewith of the lower teeth of the levers, so as to move said first plate in the way of the teeth of the levers remaining above the same, said parts being combined substantially as described.

6. In a register, a series of key-levers, a pivoted plate having an edge thereof adapted to normally be in the path of the initial movement of all except an operating one of said levers, a second pivoted plate having means connected therewith for preventing the return movement of the key-lever while engaged therewith, and a depending arm on one of said plates bearing against the other plate, said parts being combined substantially as described.

7. In a register, a series of oscillating key-levers having upper and lower projections on their front ends, a plate having an edge which during the movement of an operating key-lever is normally in the path of the upper projections of the other key-levers, a second pivoted plate with ratchet-teeth, the latter allowing the downward movement of the lever, but adapted to lock the lower tooth on an upward movement of the said lever before its complete downward stroke, and an arm on one of said plates bearing against the other plate, said parts being combined substantially as described.

8. In a cash-register, a series of oscillating key-levers normally in the same plane, an oscillating comb-plate having a series of teeth arranged at different heights and a rearwardly-extending arm, a vertically-movable rack pivoted to said arm, a register-wheel rotated by the movement of said rack, and a stationary bar for arresting the movement of said key-levers, said parts being combined substantially as described.

9. In a register, a series of oscillating key-levers normally on the same plane and each having a recess therein, an oscillating comb-plate having a series of teeth arranged at different heights, a vertically-moving rack pivoted to an arm on said comb-plate, and a ratchet-wheel with connected registering-wheel, said teeth being adapted to enter the recess in its corresponding key-lever and lock the same when it has reached its lowest point of travel, said parts being combined substantially as described.

10. In a register, an operating key-lever, a tablet-rod having a straight portion moving in guides with a projecting lower portion normally resting on a key-lever or adapted to contact therewith, and a pivoted limb adapted, when the tablet-rod is raised, to swing in line with the said straight portion thereof, and a seat or support on which the said pivoted limb rests, supporting said tablet-rod when the same is raised, said parts being combined substantially as described.

11. In a register, a key-lever, a pivoted comb-plate adapted to be oscillated by the movement of said key-levers, a rearwardly-extending arm on said comb-plate, a vertically-moving rack-bar pivoted to said arm, a ratchet-wheel engaged by said rack-bar and a register-wheel secured to said ratchet-wheel, an oscillating frame or bar with an arm bearing against said rack-bar, and mechanism, substantially as described, for oscillating said frame or bar, said parts being combined substantially as described.

12. In a register, a rising and falling rack-bar, mechanism, substantially as described, for operating said bar, a ratchet-wheel rotated by the rising of said bar, an oscillating frame or bar with arms bearing against said rack-bar, a rod connected with said oscillating frame and having a hook or nose on its end, an angle-lever with a stud on one of its limbs engaging said nose, and mechanism for operating said angle-lever, said parts being combined substantially as described.

13. In a register, a rising and falling rack-bar, mechanism, substantially as described, for lifting said bar, a ratchet-wheel engaged by said rack-bar and rotated thereby, a register-wheel connected with said ratchet-wheel, an oscillating frame having an arm bearing against said rack-bar, a rod or lever pivotally connected with said oscillating frame and having a nose or hooked end, an oscillating angle-lever with a stud or pin adapted to engage said rod, and mechanism, substantially as described, for operating said angle-lever, said parts being combined substantially as described.

14. In a register, an oscillating key-lever with a recess therein, a comb-plate with a tooth, said tooth being adapted to enter said recess and lock said lever, a rising and falling rack pivoted to an arm of said comb-plate, and register-wheels operated by the movement of said rack, said parts being combined substantially as described.

15. A series of oscillating key-levers having upper and lower teeth on their front edges, a pivoted lever with an edge in front of said levers, a second plate adapted to be operated by the lower teeth of an operating-lever so as to bear against the first plate and force its edge across the path of travel of the remaining levers, and mechanism, substantially as described, for locking said second plate during the upward movement of the key-levers, said parts being combined substantially as described.

16. A series of key-levers, a pivoted plate having an edge in the path of all of said levers except an operating one thereof, a second pivoted plate with ratchet-teeth thereon, an arm on one of said plates bearing against the other plate, a bar resting on the rear end of the lever and adapted to be raised thereby, a weighted lever adapted to engage said second plate, and mechanism connected with the bar and weighted lever for operating the said lever, said parts being combined substantially as described.

17. A stationary cross-bar forming a tablet-rod seat, an oscillating key-lever, a tablet-rod with vertical portion movable in guides, a bent lower portion having its lower end adapted to be engaged by an end of said key-lever, and a straight limb pivoted to said tablet-rod in the vertical line thereof, having its lower edge adapted to rest on said tablet-rod seat so as to sustain said rod when the tablet is raised, said parts being combined substantially as described.

18. In a register, an operating key-lever, a bar raised by said lever, a rod pivotally secured to said bar and having a projecting stud, a shaft with an oscillating arm mounted thereon and carrying a hammer-arm, a bell, and an arm pivoted to said oscillating arm and having one end bearing on the said shaft and the other end adapted to be engaged by the stud on the said rod, said parts being combined substantially as described.

19. In a register, a ratchet-wheel having a register-wheel with a stud on its side connected therewith, mechanism, substantially as described, for rotating such ratchet-wheel, a second ratchet-wheel having a connected register-wheel, a rising and falling slotted arm having suitable guides and provided with a projection adapted to be engaged by the stud on the register-wheel, and a tooth adapted to engage the said ratchet-wheel, substantially as described.

20. In a register, a frame with an oscillating angle-lever pivoted thereto, a drawer with a block in its side adapted to bear against the said angle-lever, a rod operated by the movement of said angle-lever, a rocking bar with arms operated by the said rod, a rack-bar, and a ratchet-wheel, said parts being combined substantially as described.

21. In a register, a stationary cross-bar forming a tablet-rod seat, a series of operating key-levers, a series of tablets with rods having straight portions vertically movable in guides and bent portions with lower ends adapted to be engaged by said levers, straight limbs pivoted to said straight portions at their lower ends and adapted to sustain said tablet-rods on said cross-bar, and a swinging frame adapted to contact with said pivoted limbs and remove the same from the cross-bar, said parts being combined substantially as described.

22. In a register, a frame with an oscillating lever pivoted thereto, a drawer, a sliding bolt, a coil-spring secured to the frame and bolt, a rod operated by said lever, a rocking bar with arms, a rack-bar, and a ratchet-wheel having a register-wheel secured thereto, said parts being combined substantially as described.

23. In a register, a frame, a drawer movable therein and having a recess in its side, a pivoted bolt vertically movable and adapted to enter said recess and lock said drawer, a block on the side of the drawer and a sliding bolt, and a coil-spring secured to the frame and to said sliding bolt, said sliding bolt being adapted to bear against said block, said parts being combined substantially as described.

24. In a register, a frame, a drawer movable therein having a recess in the upper edge of one of its sides, an oscillating arm in said frame having a pin, a bolt with a slot in which said pin is inserted, and a nose adapted to ride on the upper edge of the drawer entering said recess, mechanism, substantially as described, for raising said bolt, a block on the side of said drawer, a bolt bearing against said block, and a spring attached to said last bolt and to the frame, said parts being combined substantially as described.

25. In a register, a frame, a rising and falling bar with operating mechanism, a rod connected with one end thereof and movable on the frame, a pin projecting from one side of said rod, a shaft having an arm mounted thereon, a hammer-arm pivoted to said shaft-arm and having one end normally resting on the shaft, and a bell, said parts being combined substantially as described.

26. In a register, the bar N', having the rod $Z^2$, movable in ways secured to the frame A, the pin $A^3$, projecting from said rod, a shaft $U^3$, having the arm $B^3$ mounted thereon, a pivoted arm $C^3$, connected with the said arm $B^3$ and having a hammer-arm $D^3$ attached thereto, and a bell, said arm $C^3$ having one end adapted to bear normally on the shaft $U^3$ and its other end above said pin $A^3$ during a portion of the upward movement of the rod $Z^2$, said parts being combined substantially as described.

GEORGE F. KOLB.

Witnesses:
JOHN A. WIEDERSHEIM,
A. P. JENNINGS.